US011833458B2

United States Patent
Lee et al.

(10) Patent No.: US 11,833,458 B2
(45) Date of Patent: Dec. 5, 2023

(54) PRESSURIZING CENTRIFUGAL DEHYDRATOR

(71) Applicant: LG CHEM, LTD., Seoul (KR)

(72) Inventors: Sang Ho Lee, Daejeon (KR); Dae Young Shin, Daejeon (KR); Sung Woo Jeong, Daejeon (KR); Eun Jung Joo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 8 days.

(21) Appl. No.: 17/269,178

(22) PCT Filed: Jul. 13, 2020

(86) PCT No.: PCT/KR2020/009203
§ 371 (c)(1),
(2) Date: Feb. 17, 2021

(87) PCT Pub. No.: WO2021/101010
PCT Pub. Date: May 27, 2021

(65) Prior Publication Data
US 2021/0316235 A1    Oct. 14, 2021

(30) Foreign Application Priority Data
Nov. 18, 2019    (KR) .......................... 10-2019-0147409

(51) Int. Cl.
*B01D 33/11*        (2006.01)
*B01D 33/82*        (2006.01)
(Continued)

(52) U.S. Cl.
CPC .............. *B01D 33/11* (2013.01); *B01D 33/82* (2013.01); *B04B 3/02* (2013.01); *B04B 15/12* (2013.01);
(Continued)

(58) Field of Classification Search
CPC .. B01D 33/11; B01D 33/82; B01D 2201/202; B01D 2201/282; C08J 3/12; F26B 5/08;
(Continued)

(56) References Cited

U.S. PATENT DOCUMENTS

| | | | | |
|---|---|---|---|---|
| 493,900 A | * | 3/1893 | Schmerber | ................ B04B 3/02 |
| | | | | 494/47 |
| 1,267,419 A | * | 5/1918 | Kaita | ...................... B04B 11/08 |
| | | | | 210/372 |

(Continued)

FOREIGN PATENT DOCUMENTS

| | | |
|---|---|---|
| CH | 655786 A5 * | 5/1986 |
| CH | 655786 A5 | 5/1986 |

(Continued)

OTHER PUBLICATIONS

Office Action of Korean Patent Office in Appl'n. No. 10-2019-0147409, dated Aug. 2, 2022.
(Continued)

*Primary Examiner* — Charles Cooley
(74) *Attorney, Agent, or Firm* — Bryan Cave Leighton Paisner LLP

(57) ABSTRACT

A pressurizing centrifugal dehydrator for removing moisture includes: an inner basket into which slurry is introduced; an outer basket surrounding the inner basket; a pressurization chamber disposed in the outer basket; and a gas supplying portion for supplying gas into the pressurization chamber, wherein the gas supplied to the pressurization chamber is ejected from the pressurization chamber toward a dehydration product positioned between the outer basket and the pressurization chamber.

9 Claims, 4 Drawing Sheets

(51) Int. Cl.
  *B04B 3/02* (2006.01)
  *B04B 15/12* (2006.01)
  *C08J 3/12* (2006.01)
  *F26B 5/08* (2006.01)

(52) U.S. Cl.
  CPC .................. *C08J 3/12* (2013.01); *F26B 5/08* (2013.01); *B01D 2201/202* (2013.01); *B01D 2201/282* (2013.01)

(58) Field of Classification Search
  CPC ...... F26B 5/041; F26B 21/001; F26B 25/002; F26B 25/18; B04B 3/02; B04B 15/12; B04B 3/00; B04B 15/00; B04B 1/00; B04B 11/00; B04B 15/06
  USPC .............................................. 210/360.1–379
  See application file for complete search history.

(56) References Cited

U.S. PATENT DOCUMENTS

| | | | | |
|---|---|---|---|---|
| 1,336,722 A * | 4/1920 | Behr | ........................ | B04B 3/04 210/370 |
| 1,342,743 A * | 6/1920 | Elmore | ................... | B04B 11/02 210/376 |
| 1,449,290 A * | 3/1923 | Kirshner | ................... | C11B 1/06 210/488 |
| 1,761,593 A * | 6/1930 | Sharples | ................. | B04B 11/04 210/772 |
| 1,842,464 A * | 1/1932 | Gustav | ..................... | B04B 3/02 210/376 |
| 1,858,574 A * | 5/1932 | Bonsiakos | .............. | B04B 11/04 210/376 |
| 1,903,298 A * | 4/1933 | Roberts | ................... | B04B 11/05 210/368 |
| 1,909,188 A * | 5/1933 | Roberts | ................... | B04B 11/05 210/368 |
| 1,940,812 A * | 12/1933 | Roberts | ................... | B04B 11/05 494/47 |
| 1,965,840 A * | 7/1934 | Jones | ...................... | B04B 11/08 210/139 |
| 2,106,986 A * | 2/1938 | Pearce | .................... | C10G 1/04 494/52 |
| 2,111,508 A * | 3/1938 | Jones | ..................... | C10G 73/28 494/59 |
| 2,119,644 A * | 6/1938 | Miller | ..................... | B04B 13/00 210/368 |
| 2,138,476 A * | 11/1938 | Jones | ..................... | B04B 11/04 210/768 |
| 2,232,768 A * | 2/1941 | Buddeberg | .............. | B04B 3/02 210/376 |
| 2,232,769 A * | 2/1941 | Buddeberg | .............. | B04B 3/02 210/138 |
| 2,232,770 A * | 2/1941 | Buddeberg | .............. | B04B 3/02 210/368 |
| 2,360,455 A * | 10/1944 | Vilter | ...................... | B04B 11/04 210/376 |
| 2,398,967 A * | 4/1946 | Schutte | ..................... | B04B 3/00 210/138 |
| 2,462,098 A * | 2/1949 | Hertrich | ................... | B04B 3/04 210/376 |
| 2,490,108 A * | 12/1949 | Walkup | ............... | C06B 21/0091 210/369 |
| 2,685,370 A * | 8/1954 | Ruegg | ..................... | B04B 3/02 210/376 |
| 2,720,981 A * | 10/1955 | Greenwell | ................ | B04B 3/02 210/376 |
| 2,720,982 A * | 10/1955 | Stuart, II | .................. | B04B 3/02 210/376 |
| 2,732,073 A * | 1/1956 | Ruegg | ..................... | B04B 3/02 210/330 |
| 2,755,934 A * | 7/1956 | Ruegg | ..................... | B04B 3/02 210/376 |
| 2,828,021 A * | 3/1958 | Ruegg | ....................... | B04B 3/02 210/376 |
| 2,845,178 A * | 7/1958 | Buddeberg | ................ | B04B 3/02 210/376 |
| 2,862,659 A * | 12/1958 | Nyrop | ....................... | B04B 1/18 494/10 |
| 2,868,381 A * | 1/1959 | Siegrist | .................... | B04B 11/02 210/376 |
| 2,870,913 A * | 1/1959 | Gertr | ........................ | B04B 3/06 210/376 |
| 2,889,930 A * | 6/1959 | Tholl | ....................... | B04B 11/05 210/376 |
| 2,899,065 A * | 8/1959 | Irving | ....................... | B04B 3/02 210/147 |
| 2,991,887 A * | 7/1961 | Kocher | ..................... | B04B 3/06 210/376 |
| 3,038,611 A * | 6/1962 | O'Conor | ................. | B04B 13/00 210/138 |
| 3,049,241 A * | 8/1962 | Ruegg | ....................... | B04B 7/18 210/376 |
| 3,063,981 A * | 11/1962 | Cochrane, III | ......... | C08B 17/04 210/376 |
| 3,076,552 A * | 2/1963 | Ruegg | ....................... | B04B 3/02 210/376 |
| 3,087,621 A * | 4/1963 | Gooch | ..................... | B04B 3/00 494/47 |
| 3,092,580 A * | 6/1963 | Irving | .................... | B43K 24/08 210/376 |
| 3,108,951 A * | 10/1963 | Scheel | ................... | B04B 15/12 210/376 |
| 3,136,721 A * | 6/1964 | Gooch | ..................... | B04B 3/02 210/376 |
| 3,136,722 A * | 6/1964 | Gooch | ..................... | B04B 3/02 210/376 |
| 3,152,074 A * | 10/1964 | Fontein | ..................... | F26B 5/08 210/194 |
| 3,171,809 A * | 3/1965 | Cox | .......................... | B04B 3/02 210/376 |
| 3,221,879 A * | 12/1965 | Irving | ....................... | B04B 3/04 210/376 |
| 3,224,588 A * | 12/1965 | Ruegg | ....................... | B04B 5/10 210/376 |
| 3,268,078 A * | 8/1966 | Muggli | .................... | B04B 15/08 210/376 |
| 3,268,083 A * | 8/1966 | Ruegg | ....................... | B04B 3/02 210/376 |
| 3,275,142 A * | 9/1966 | Ekegren | ................. | D06B 15/10 34/313 |
| 3,302,793 A * | 2/1967 | Stohlmeier | ............... | B04B 1/02 210/376 |
| 3,322,336 A * | 5/1967 | Lohse | ..................... | B04B 11/02 494/56 |
| 3,338,418 A * | 8/1967 | Koslowski | ............... | B04B 11/04 494/60 |
| 3,344,738 A * | 10/1967 | Pause | ........................ | B30B 9/02 210/330 |
| 3,368,684 A * | 2/1968 | Ruegg | ....................... | G03H 3/00 494/44 |
| 3,377,019 A * | 4/1968 | Cox | .......................... | B04B 3/00 494/36 |
| 3,385,443 A * | 5/1968 | Cuza | ....................... | B04B 15/00 494/36 |
| 3,395,807 A * | 8/1968 | Fierstine | .................. | B04B 7/16 210/376 |
| 3,409,137 A * | 11/1968 | Schneider | ................ | B04B 3/02 210/376 |
| 3,463,316 A * | 8/1969 | Fierstine | ................ | B04B 13/00 210/376 |
| 3,463,318 A * | 8/1969 | Lutter | ...................... | B04B 7/04 210/376 |
| 3,474,905 A * | 10/1969 | Hans-Joachim | ........ | B04B 11/02 210/791 |
| 3,504,794 A * | 4/1970 | Tholl | ...................... | B04B 11/04 210/746 |
| 3,570,135 A * | 3/1971 | Rousselete | ................ | F26B 5/08 210/376 |

(56) References Cited

U.S. PATENT DOCUMENTS

| | | | | |
|---|---|---|---|---|
| 3,585,132 | A * | 6/1971 | Ruegg | B04B 3/02 210/376 |
| 3,608,733 | A * | 9/1971 | Okvist | B01D 21/262 210/376 |
| 3,724,091 | A * | 4/1973 | Rousselet | B04B 3/00 34/58 |
| 3,788,470 | A * | 1/1974 | Pelmulder | B01D 35/20 210/781 |
| 3,797,663 | A * | 3/1974 | Bourdale | B01D 45/14 210/402 |
| 3,831,764 | A * | 8/1974 | Humphrey | B04B 3/02 210/376 |
| 3,864,256 | A * | 2/1975 | Hultsch | B01D 33/11 494/39 |
| 3,943,056 | A * | 3/1976 | Hultsch | B04B 15/08 210/744 |
| 3,945,921 | A * | 3/1976 | Toth | B04B 9/146 34/328 |
| 3,957,649 | A * | 5/1976 | Hine | D06F 23/00 210/376 |
| 3,972,514 | A * | 8/1976 | Voitsekhovsky | C22B 9/02 266/120 |
| 4,052,303 | A * | 10/1977 | Hultsch | B04B 3/00 494/900 |
| 4,073,731 | A * | 2/1978 | Fanta | B04B 3/02 494/60 |
| 4,101,421 | A * | 7/1978 | Hultsch | B04B 11/082 210/381 |
| 4,173,303 | A * | 11/1979 | Cyphelly | B04B 9/00 91/40 |
| 4,209,405 | A * | 6/1980 | Christ | B04B 3/02 210/376 |
| 4,217,226 | A * | 8/1980 | Kampeen | B04B 3/02 210/376 |
| 4,226,724 | A * | 10/1980 | Sturmer | B04B 3/02 210/376 |
| 4,279,741 | A * | 7/1981 | Campbell | B04B 3/00 209/486 |
| 4,320,007 | A * | 3/1982 | Hultsch | B04B 3/02 210/376 |
| 4,362,620 | A * | 12/1982 | High | B04B 11/02 494/56 |
| 4,434,052 | A * | 2/1984 | M/u/ | B04B 3/02 210/376 |
| 4,493,768 | A * | 1/1985 | Kubr | B04B 3/02 210/360.2 |
| 4,493,769 | A * | 1/1985 | Paschedag | B04B 3/02 210/360.2 |
| 4,640,770 | A * | 2/1987 | Smith | B04B 3/00 494/36 |
| 4,652,254 | A * | 3/1987 | Matsumoto | B04B 11/02 210/372 |
| 4,724,077 | A * | 2/1988 | Uchiyama | B01D 33/11 210/403 |
| 4,749,486 | A * | 6/1988 | Yaoxin | B04B 3/02 210/376 |
| 4,832,853 | A * | 5/1989 | Shiraki | B04B 3/00 210/360.2 |
| 4,842,722 | A * | 6/1989 | Holz | B01D 33/68 209/384 |
| 4,889,627 | A * | 12/1989 | Hoppe | B04B 3/02 210/360.2 |
| 4,895,666 | A * | 1/1990 | Franzen | B04B 11/082 210/744 |
| 4,997,575 | A * | 3/1991 | Hultsch | B04B 3/00 210/368 |
| 5,021,158 | A * | 6/1991 | Schiele | B04B 3/02 494/36 |
| 5,032,258 | A * | 7/1991 | Hultsch | B04B 3/00 210/120 |
| 5,092,995 | A * | 3/1992 | Gerteis | B04B 3/025 494/23 |
| 5,114,568 | A * | 5/1992 | Brinsmead | B03D 1/1462 210/512.1 |
| 5,205,933 | A * | 4/1993 | Bernd | B04B 3/02 210/376 |
| 5,227,066 | A * | 7/1993 | Ishida | B04B 15/12 210/368 |
| 5,250,180 | A * | 10/1993 | Chang | B04B 11/08 210/372 |
| 5,300,233 | A * | 4/1994 | Lee | B01D 33/60 210/772 |
| 5,305,685 | A * | 4/1994 | Midden | A47J 31/60 210/376 |
| 5,306,423 | A * | 4/1994 | Hultsch | B04B 3/025 210/232 |
| 5,326,470 | A * | 7/1994 | Shaw | D21D 5/026 210/396 |
| 5,356,366 | A * | 10/1994 | Stahl | B04B 3/02 494/36 |
| 5,460,717 | A * | 10/1995 | Grimwood | B04B 11/08 210/402 |
| 5,468,389 | A * | 11/1995 | Keller | B04B 3/02 210/360.2 |
| 5,567,321 | A * | 10/1996 | Weber | B04B 3/02 210/396 |
| 5,618,423 | A * | 4/1997 | Lin | B01D 33/073 210/402 |
| 5,676,835 | A * | 10/1997 | Derton | B04B 3/06 494/47 |
| 5,865,993 | A * | 2/1999 | Wienicke | B04B 15/12 34/376 |
| 5,882,529 | A * | 3/1999 | Gupta | B01D 21/0012 210/791 |
| 5,935,438 | A * | 8/1999 | Greiner-Sturmer | B04B 3/02 210/376 |
| 5,942,170 | A * | 8/1999 | Peitz | B29C 48/92 366/291 |
| 5,958,235 | A * | 9/1999 | Leung | B04B 3/04 494/36 |
| 5,972,210 | A * | 10/1999 | Munkel | B01D 29/606 210/90 |
| 6,047,835 | A * | 4/2000 | Birken | B04B 15/06 210/372 |
| 6,395,187 | B1 * | 5/2002 | Alanis | B01D 29/6484 100/145 |
| 6,440,316 | B1 * | 8/2002 | Yoon | B04B 3/00 210/781 |
| 6,488,849 | B2 * | 12/2002 | Bertolotti | B01D 33/48 210/393 |
| 6,547,972 | B1 * | 4/2003 | Stahl | B04B 3/02 210/781 |
| 6,651,822 | B2 * | 11/2003 | Alanis | B01D 29/6476 100/145 |
| 6,736,968 | B2 * | 5/2004 | Mullins | B04B 11/04 210/232 |
| 7,017,756 | B2 * | 3/2006 | Reinach | B04B 11/06 464/36 |
| 7,025,211 | B2 * | 4/2006 | Reinach | B04B 3/02 464/36 |
| 7,032,759 | B2 * | 4/2006 | Reinach | B04B 3/02 210/372 |
| 7,168,571 | B2 * | 1/2007 | Gerteis | B04B 15/08 210/372 |
| 8,349,172 | B2 * | 1/2013 | Schoeb | B01D 29/885 415/121.2 |
| 8,574,143 | B2 * | 11/2013 | Astheimer | B08B 9/0813 494/60 |
| 8,813,974 | B1 * | 8/2014 | Angus | B04B 3/06 210/384 |
| 8,980,086 | B2 * | 3/2015 | Vanier | C05F 7/00 210/252 |
| 9,248,455 | B2 * | 2/2016 | Teduka | B04B 7/18 |
| 9,358,484 | B2 * | 6/2016 | Tange | B01D 36/045 |
| 9,561,978 | B2 * | 2/2017 | Theodoulou | B30B 9/12 |
| 10,363,500 | B2 * | 7/2019 | Keller | B01D 33/48 |
| 10,974,982 | B2 * | 4/2021 | Yamashita | C02F 11/147 |
| 11,014,098 | B2 * | 5/2021 | Stephens | B01D 11/0273 |

(56) References Cited

U.S. PATENT DOCUMENTS

| | | | |
|---|---|---|---|
| 2002/0030024 A1* | 3/2002 | Leung | B04B 1/2008 210/376 |
| 2003/0042193 A1* | 3/2003 | Alanis | B01D 29/6484 210/413 |
| 2004/0206686 A1* | 10/2004 | Reinach | B04B 11/06 210/360.1 |
| 2004/0206687 A1* | 10/2004 | Reinach | B04B 3/02 210/360.1 |
| 2004/0206688 A1* | 10/2004 | Reinach | B04B 3/02 210/369 |
| 2004/0206689 A1* | 10/2004 | Reinach | B04B 3/02 210/369 |
| 2005/0000869 A1* | 1/2005 | Kessler | B04B 3/00 494/36 |
| 2005/0009681 A1* | 1/2005 | Carr | B04B 11/05 494/82 |
| 2005/0109713 A1 | 5/2005 | Shepherd et al. | |
| 2008/0190870 A1* | 8/2008 | Schoeb | F04D 13/0606 210/416.1 |
| 2011/0079044 A1* | 4/2011 | Teduka | B04B 15/10 62/123 |
| 2014/0021147 A1* | 1/2014 | Leach | B01D 21/262 210/781 |
| 2014/0346126 A1* | 11/2014 | Teduka | B01D 17/08 210/769 |
| 2015/0096128 A1* | 4/2015 | Sawford | D06F 39/14 68/17 R |
| 2015/0096129 A1* | 4/2015 | Sawford | D06F 39/081 8/137 |
| 2015/0367260 A1* | 12/2015 | Keller | B01D 33/46 210/360.2 |
| 2016/0115065 A1* | 4/2016 | Yamashita | C02F 11/02 210/174 |
| 2016/0115066 A1* | 4/2016 | Yamashita | C02F 11/147 210/252 |
| 2017/0233938 A1* | 8/2017 | Hwang | D06F 39/10 68/18 F |
| 2018/0230036 A1* | 8/2018 | Yamashita | C02F 11/125 |
| 2019/0046998 A1* | 2/2019 | Stephens | B04B 3/00 |
| 2020/0254463 A1* | 8/2020 | Goertz | B01D 29/073 |
| 2020/0316501 A1* | 10/2020 | Jones | B01D 33/11 |
| 2021/0001353 A1* | 1/2021 | Scherer | B04B 9/04 |
| 2021/0069730 A1* | 3/2021 | Stephens | B01D 11/0273 |
| 2021/0162325 A1* | 6/2021 | Krampe | B01D 33/801 |
| 2021/0220843 A1* | 7/2021 | Stephens | B01D 11/0273 |
| 2021/0229112 A1* | 7/2021 | Stephens | B04B 3/00 |
| 2021/0316235 A1* | 10/2021 | Lee | B01D 33/11 |
| 2022/0016646 A1* | 1/2022 | Lee | B04B 7/12 |
| 2022/0388014 A1* | 12/2022 | Jeong | F26B 5/08 |

FOREIGN PATENT DOCUMENTS

| | | | |
|---|---|---|---|
| CN | 1649656 A | | 8/2005 |
| CN | 207507067 U | | 6/2018 |
| DE | 102011055513 A1 | | 5/2013 |
| GB | 753024 A | | 7/1956 |
| GB | 2485180 A | | 5/2012 |
| JP | 06-77836 U | | 11/1994 |
| JP | 2004-230219 A | | 8/2004 |
| JP | 2015-199044 A | | 11/2015 |
| KR | 0145510 B1 | | 7/1998 |
| KR | 10-0788236 B1 | | 12/2007 |
| KR | 10-0872358 B1 | | 12/2008 |
| KR | 10-1332031 B1 | | 11/2013 |
| KR | 20210059956 A | * | 5/2021 |
| KR | 20210059957 A | * | 5/2021 |
| KR | 20220045367 A | * | 4/2022 |
| WO | 2012059706 A1 | | 5/2012 |
| WO | WO-2021101010 A1 | * | 5/2021 ............ B01D 33/11 |
| WO | WO-2022075582 A1 | * | 4/2022 ............ B04B 1/12 |

OTHER PUBLICATIONS

Search Report of the European Patent Office from Appl'n No. 20848780.1, dated Sep. 1, 2021.

* cited by examiner (a)     (b)

-RELATED ART-

PRESSURIZING CENTRIFUGAL DEHYDRATOR

CROSS-REFERENCE TO RELATED APPLICATIONS

The present application is a National Phase entry pursuant to 35 U.S.C. § 371 of International Application No. PCT/KR2020/009203, filed on Jul. 13, 2020, and claims the benefit of and priority to Korean Patent Application No. 10-2019-0147409, filed on Nov. 18, 2019, the disclosure of which are incorporated by reference in their entirety for all purposes as if fully set forth herein.

TECHNICAL FIELD

The present invention relates to a pressurizing centrifugal dehydrator for removing moisture, and more particularly, to a pressurizing centrifugal dehydrator capable of applying a centrifugal force and a pressurizing force at the same time.

BACKGROUND ART

In a case of producing a polymer using an emulsion polymerization process, removal of moisture included in slurry generated after polymerization is a main issue. In the existing polymer producing process, a centrifugal dehydrator is generally used to primarily remove moisture, and finally, remaining moisture is completely removed through a drying process after centrifugal dehydration.

In the drying process, a hot-air drying method is generally used. In this case, however, energy cost is high, and thus it is a key point in improving process economic efficiency to decrease a moisture content before performing the drying process.

In general, as the centrifugal dehydrator, a pusher (push type) centrifugal dehydrator is used for a continuous process configuration. The pusher centrifugal dehydrator may be operated at a high speed to apply a high centrifugal force, and may be operated in a continuous process. Therefore, the pusher centrifugal dehydrator has been adopted and used in multiple processes.

However, there is a limitation in centrifugal force that may be provided by the pusher centrifugal dehydrator, and thus a moisture content of a product may not be decreased to below a predetermined value, which is problematic. Further, the pusher centrifugal dehydrator has a problem that a pipe for supplying slurry or washing water extends up to an inner basket, and thus pressure formation in the centrifugal dehydrator is hindered. In addition, a moisture content at the latter stage of the pusher centrifugal dehydrator depends on a characteristic (size or hydrophilicity) of a particle, and in a case where the size of a particle needs to be small for compounding, a moisture content is increased, which results in an increase in load in the drying process.

DISCLOSURE

Technical Problem

The present invention has been made in an effort to solve the above-described problems according to the related art, and an object of the present invention is to provide a pressurizing centrifugal dehydrator that applies a centrifugal force and a pressurizing force at the same time to improve dehydration performance.

Technical Solution

To achieve the above-described object, the present invention provides a pressurizing centrifugal dehydrator for removing moisture, including: an inner basket into which slurry is introduced; an outer basket surrounding the inner basket; a pressurization chamber disposed in the outer basket; and a gas supplying portion for supplying gas into the pressurization chamber, wherein the gas supplied to the pressurization chamber is ejected from the pressurization chamber toward a dehydration product positioned between the outer basket and the pressurization chamber.

In the pressurizing centrifugal dehydrator according to the present invention, at least one of meshes, slits, or holes through which gas passes are formed in a circumferential surface of the pressurization chamber.

In the pressurizing centrifugal dehydrator according to the present invention, a slurry supplying portion hole through which a slurry supplying portion for supplying the slurry to the inner basket penetrates is formed in the pressurization chamber.

In the pressurizing centrifugal dehydrator according to the present invention, a washing water supplying portion hole through which a washing water supplying portion for supplying washing water to the inner basket penetrates is formed in the pressurization chamber.

In the pressurizing centrifugal dehydrator according to the present invention, the gas moves outward from a central portion of the pressurization chamber.

In the pressurizing centrifugal dehydrator according to the present invention, the pressurization chamber includes: a pressurization chamber rotating portion that is fixed to the outer basket and rotates together with the outer basket; a pressurization chamber fixing portion that is disposed in the pressurization chamber rotating portion and is fixed without rotating; and a rotating-fixing connection portion disposed between the pressurization chamber rotating portion and the pressurization chamber fixing portion.

In the pressurizing centrifugal dehydrator according to the present invention, the gas supplying portion is connected to the pressurization chamber fixing portion.

In the pressurizing centrifugal dehydrator according to the present invention, the rotating-fixing connection portion fixes the pressurization chamber fixing portion while allowing rotation of the pressurization chamber rotating portion.

In the pressurizing centrifugal dehydrator according to the present invention, an interval between the pressurization chamber and the outer basket decreases as distance from the inner basket increases.

The dehydration product is continuously discharged from the pressurizing centrifugal dehydrator according to the present invention.

Advantageous Effects

With the pressurizing centrifugal dehydrator according to the present invention, gas supplied to the pressurization chamber is ejected from the pressurization chamber toward a dehydration product positioned between the outer basket and the pressurization chamber. Accordingly, in addition to the centrifugal force, the pressurization force can be applied to remove moisture remaining in the dehydration product, such that dehydration performance can be significantly improved, as compared with the centrifugal dehydrator according to the related art.

With the pressurizing centrifugal dehydrator according to the present invention, a pressurization centrifugal dehydration technique can be applied while maintaining the components of the centrifugal dehydrator according to the related art without any change. Therefore, an existing device is reusable.

BEST MODE

Hereinafter, preferred embodiments of the present invention will be described in detail with reference to the exemplary drawings.

Figure 6:
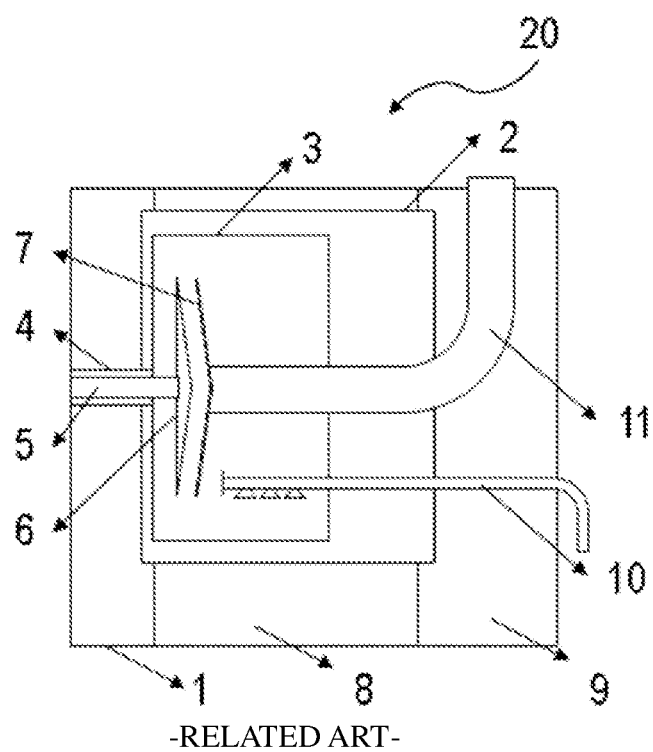
FIG. 6 is an exemplary cross-sectional view of a centrifugal dehydrator according to the related art.

First, a centrifugal dehydrator 20 according to the related art will be described with reference to FIG. 6.

The centrifugal dehydrator 20 according to the related art includes a dehydrator case 1, an inner basket 3 into which slurry is introduced, an outer basket 2 surrounding the inner basket 3, an outer basket shaft 4, an inner basket shaft 5, a slurry dispersing plate 6, a slurry discharging portion 7, a dehydration and washing water treatment region 8, a dehydration product treatment region 9, a washing water supplying portion 10, and a slurry supplying portion 11.

The centrifugal dehydrator 20 according to the related art may perform removal of moisture from polymer slurry and washing with washing water at the same time in a polymer producing process, and thus has been commonly used in the relevant field. However, there is a limitation in centrifugal force that may be provided by the centrifugal dehydrator 20, and thus it is difficult to decrease a moisture content of a product to below a predetermined value, which is problematic.

In addition, the centrifugal dehydrator 20 according to the related art has a structural characteristic in which slurry is supplied to the inner basket 3 through the slurry supplying portion 11, moisture is removed from the slurry, and then a dehydration product obtained by the removal of the moisture is discharged to the outside through the outer basket 2 and the dehydration product treatment region 9. Therefore, it is not possible to maintain airtightness of the basket, and it is thus not possible to perform pressurization by injecting gas into the basket.

On the other hand, with a pressurizing centrifugal dehydrator 100 according to the present invention, a pressurization centrifugal dehydration technique can be applied while maintaining the above-described components of the centrifugal dehydrator 20 according to the related art without any change. Therefore, an existing device is reusable. Accordingly, for the pressurizing centrifugal dehydrator 100 according to the present invention, reference numerals of the components of the centrifugal dehydrator 20 according to the related art in FIG. 6 are used as they are.

Figure 1:
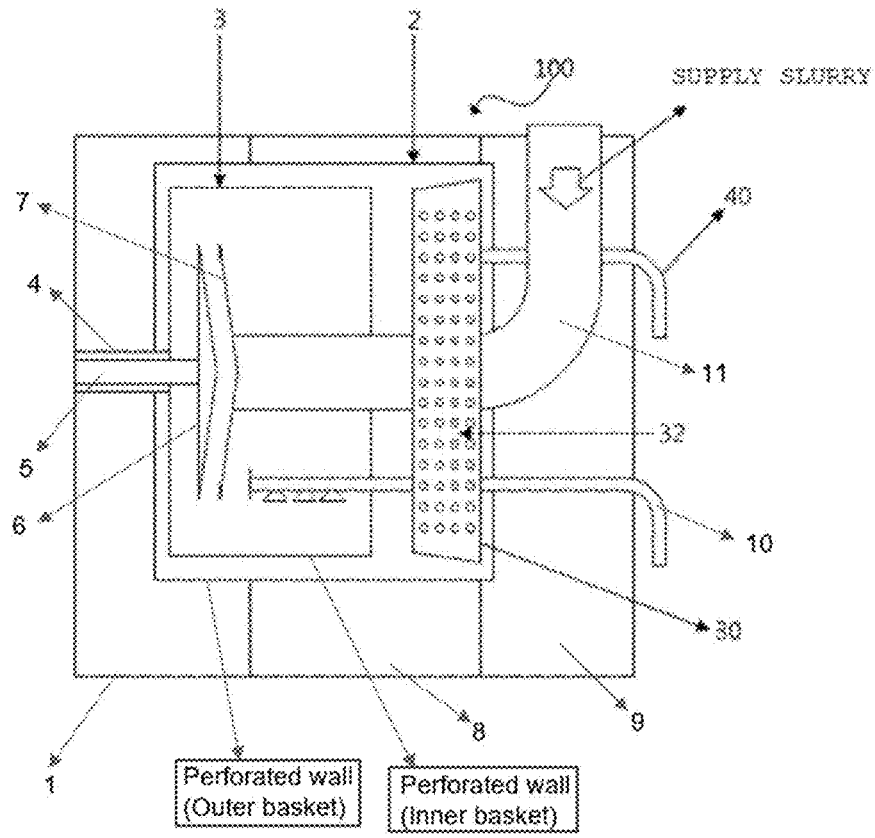
FIG. 1 is an exemplary cross-sectional view of a pressurizing centrifugal dehydrator according to the present invention.

The pressurizing centrifugal dehydrator 100 according to the present invention will be described with reference to FIG. 1. In FIG. 1, only reference numerals of main components of the pressurizing centrifugal dehydrator 100 according to the present invention are illustrated.

Figure 2:
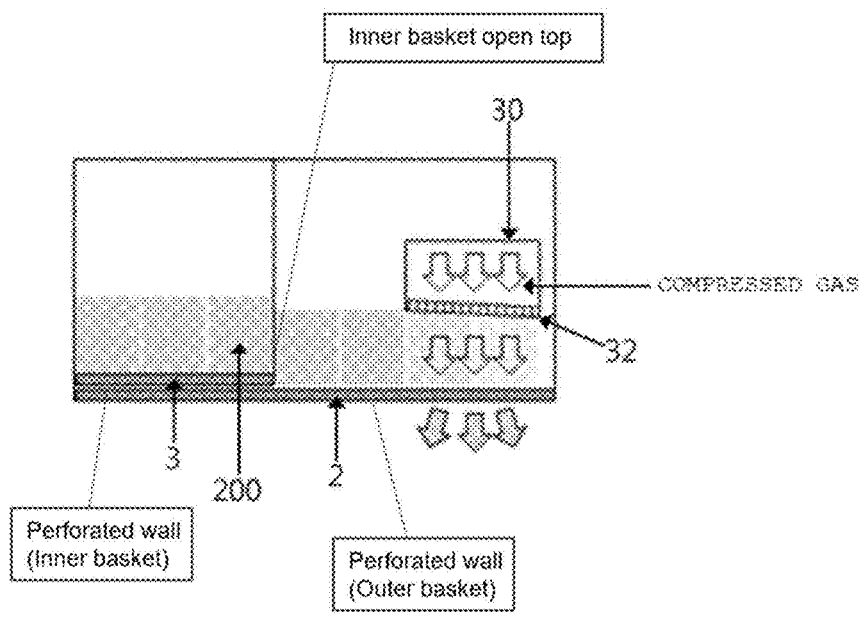
FIG. 2 is an enlarged cross-sectional view of a pressurization chamber portion of the pressurizing centrifugal dehydrator according to the present invention.

The pressurizing centrifugal dehydrator 100 for removing moisture according to the present invention includes an inner basket 3 into which slurry is introduced, an outer basket 2 surrounding the inner basket, a pressurization chamber 30 disposed in the outer basket 2, and a gas supplying portion 40 for supplying gas into the pressurization chamber 30. The gas supplied to the pressurization chamber 30 is ejected from the pressurization chamber 30 toward a dehydration product 200 positioned between the outer basket 2 and the pressurization chamber 30 as illustrated in FIG. 2.

As illustrated in FIG. 1, the pressurization chamber 30 is disposed not in the inner basket 3, but in the outer basket 2. At least one of meshes, slits, or holes through which gas passes are formed in a circumferential surface 32 of the pressurization chamber 30. The meshes, slits, holes, or the like formed in the circumferential surface 32 of the pressurization chamber 30 form a pressurization gas path, such that pressurization gas is uniformly supplied from the pressurization chamber 30 to the dehydration product 200. In FIG. 1, holes are formed in the circumferential surface 32 of the pressurization chamber 30. However, any structure can be formed as long as gas can pass, the structure is not necessarily limited to the meshes, slits, and holes, and the number of structures is not limited.

According to an embodiment of the present invention, the pressurizing centrifugal dehydrator 100 can include a slurry supplying portion 11 for supplying the slurry to the inner basket.

The slurry introduced through the slurry supplying portion 11 is discharged to the inner basket 3 through a slurry discharging portion 7, and the slurry discharged through the slurry discharging portion 7 can be disposed in the inner basket 3 by a slurry dispersing plate 6.

According to an embodiment of the present invention, in the pressurizing centrifugal dehydrator 100, moisture is removed from the slurry by a centrifugal force of the inner basket 3 and the outer basket 2 caused by rotation of an inner basket shaft 5 and an outer basket shaft 4, and the removed moisture (dehydration) can pass through the outer basket 2 and be discharged through a dehydration and washing water treatment region 8.

Further, in the pressurizing centrifugal dehydrator 100, the dehydration product 200 is continuously pushed out along an inner circumferential surface of the inner basket 3 around the inner basket shaft 5 of the inner basket 3 due to reciprocation of the inner basket shaft 5 and the outer basket shaft 4, and the pushed-out dehydration product 200 can be pushed toward between an outer circumference of the pressurization chamber 30 and an inner side of the outer basket 2 to move to the dehydration product treatment region 9 and be discharged to the outside.

According to an embodiment of the present invention, in the pressurizing centrifugal dehydrator 100, as gas is supplied to the pressurization chamber 30 through the gas supplying portion 40, the dehydration product 200 positioned between the outer basket 2 and the pressurization chamber 30 is pressurized, such that, in addition to the centrifugal force, a pressurization force caused by the gas can improve dehydration performance of the pressurizing centrifugal dehydrator 100. Specifically, as gas is ejected to pressurize the dehydration product 200 positioned between the outer basket 2 and the pressurization chamber 30, moisture that is not removable only with the centrifugal force and thus remains in the dehydration product 200 can be additionally removed by a pressurization force of the supplied gas. Therefore, dehydration performance can be significantly improved, as compared with the centrifugal dehydrator 20 according to the related art. That is, as two forces, the centrifugal force and the pressurization force, are applied at the same time, the dehydration performance can be improved. Further, according to an embodiment of the present invention, the dehydration product 200 positioned between the pressurization chamber 30 and the outer basket 2 can be discharged by a dehydration product 200 pushed from the inside of the outer basket. Specifically, the discharge of the dehydration product 200 positioned between the outer circumference of the pressurization chamber 30 and the inner side of the outer basket 2 can mean that a process, in which the dehydration product 200 does not remain between the outer circumference of the pressurization chamber 30 and the inner side of the outer basket 2, but is discharged by being pushed by another dehydration product 200 pushed from the inside of the outer basket 2, and the another dehydration product 200 pushed from the inside of the outer basket 2 is positioned between the pressurization chamber 30 and the outer basket 2, is repeated, and thus the dehydration product 200 always exists between the pressurization chamber 30 and the outer basket 2.

As described above, the process, in which the dehydration product 200 is discharged by being pushed by another dehydration product 200 pushed from the inside of the outer basket 2, and the another dehydration product 200 pushed from the inside of the outer basket 2 is positioned between the pressurization chamber 30 and the outer basket 2, is repeated, such that the dehydration product 200 can be continuously discharged by passing between the outer circumference of the pressurization chamber 30 and the inner side of the outer basket 2.

FIG. 2 illustrates in detail that the gas supplied to the pressurization chamber 30 is ejected from the pressurization chamber 30 toward the dehydration product 200 positioned between the outer basket 2 and the pressurization chamber 30. Since moisture that is not removable only with the centrifugal force and thus remains in the dehydration product 200 can be additionally removed by the pressurization force of the gas of the pressurization chamber 30, dehydration performance can be significantly improved, as compared with the centrifugal dehydrator 20 according to the related art. That is, as two forces, the centrifugal force and the pressurization force, are applied at the same time, the dehydration performance is improved.

As illustrated in FIG. 2, an interval between the pressurization chamber 30 and the outer basket 2 can decrease as distance from the inner basket 3 increases. That is, the circumferential surface 32 of the pressurization chamber 30 can be inclined. With such a configuration, it may be easy for the dehydration product 200 to move to a region between the pressurization chamber 30 and the outer basket 2. The dehydration product 200 can be continuously supplied to a dehydration region by a force in an axial direction and then discharged. Further, a region where pressurization and rotation are performed at the same time can be limited to the region between the pressurization chamber 30 and the outer basket 2. Therefore, it is not necessary to seal the entire outer basket 2 to maintain a pressure.

Figure 3:
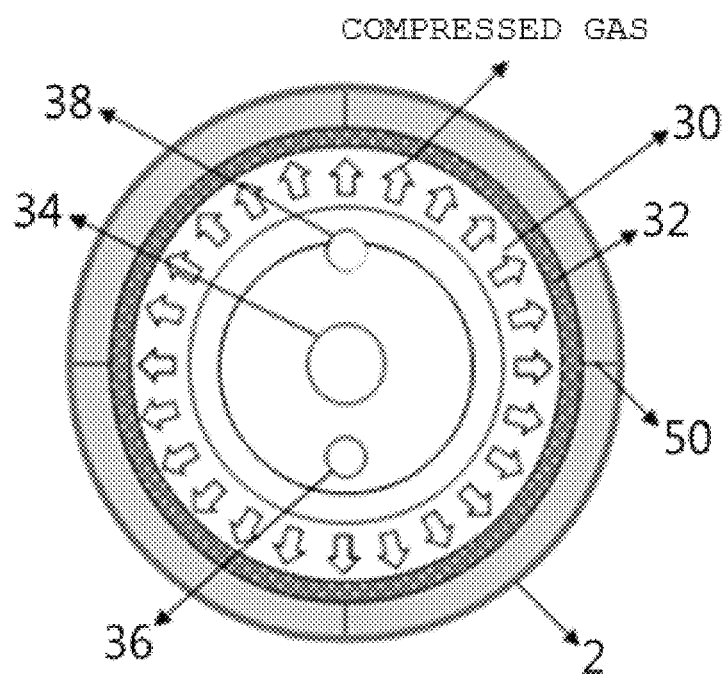
FIG. 3 is a cross-sectional view of the pressurization chamber portion of the pressurizing centrifugal dehydrator according to the present invention when viewed from another direction.

As illustrated in FIG. 3, in the pressurization chamber 30, a slurry supplying portion hole 34 through which the slurry supplying portion 11 penetrates, a washing water supplying portion hole 36 through which a washing water supplying portion 10 penetrates, and a gas supplying portion hole 38 which communicates with the gas supplying portion 40 are formed. In a case where an additional pipe is provided in the centrifugal dehydrator 20 according to the related art, a hole through which the corresponding pipe can penetrate can be additionally formed in the pressurization chamber 30. Accordingly, the pressurization centrifugal dehydration technique can be applied while maintaining the components of the centrifugal dehydrator 20 according to the related art without any change. Therefore, an existing device is reusable. FIG. 3 also illustrates a flow of gas.

Here, the pressurization chamber 30 can be fixed by the slurry supplying portion 11, the washing water supplying portion 10, the gas supplying portion 40, and the like, penetrating through a pressurization chamber fixing portion of the pressurization chamber 30, or can be fixed by another pipe. Further, a fixing target of the pressurization chamber fixing portion 64 is not limited.

A basket fixing portion 50 illustrated in FIG. 3 fixes the pressurization chamber 30 and the outer basket 2 and allows the pressurization chamber 30 to rotate together with the outer basket 2.

The pressurization chamber 30 will be described in more detail with reference to FIG. 4.

The pressurization chamber 30 can include a pressurization chamber rotating portion 62 that is fixed to the outer basket 2 and rotates together with the outer basket 2, the pressurization chamber fixing portion 64 that is disposed in the pressurization chamber rotating portion 62 and is fixed without rotating, and a rotating-fixing connection portion 66 disposed between the pressurization chamber rotating portion 62 and the pressurization chamber fixing portion 64.

The pressurization chamber 30 and the outer basket 2 need to equally rotate together in order to obtain the centrifugal force and gas pressurization effect at the same time in a state where the dehydration product 200 closely adheres between the pressurization chamber 30 and the outer basket 2. To this end, the pressurization chamber 30 can be separated into the pressurization chamber rotating portion 62 that is fixed to the outer basket 2 and rotates together, and the pressurization chamber fixing portion 64 that is fixed without rotating.

The pressurization chamber rotating portion 62 rotates together with the outer basket 2, thereby minimizing friction caused by rotation of the dehydration product 200.

The pressurization chamber rotating portion 62 is fixed to the outer basket 2 through the basket fixing portion 50. The pressurization chamber fixing portion 64 can be fixed to the slurry supplying portion 11 or the like, or can be fixed to another pipe. A fixing target of the pressurization chamber fixing portion 64 is not limited. The rotating-fixing connection portion 66 connects the pressurization chamber rotating portion 62 and the pressurization chamber fixing portion 64 that are separate from each other, and parts such as a bearing and a roller can be used. However, the rotating-fixing connection portion 66 is not limited thereto. Therefore, the pressurization chamber rotating portion 62 rotates together with the outer basket 2, and the rotation is transferred to the rotating-fixing connection portion 66. However, the pressurization chamber fixing portion 64 is fixed.

Figure 4:
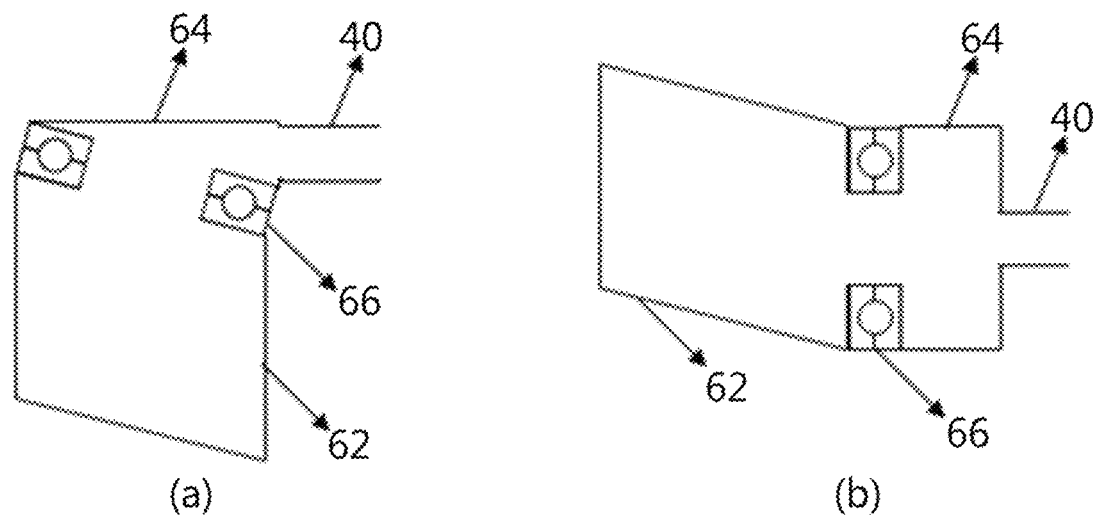
FIG. 4 is a view of examples of a structure of a pressurization chamber of the pressurizing centrifugal dehydrator according to the present invention.

(a) and (b) of FIG. 4 illustrates views of examples of arrangement of the pressurization chamber rotating portion 63, the pressurization chamber fixing portion 64, and the rotating-fixing connection portion 66. The gas supplying portion 40 is connected to the pressurization chamber fixing portion 64.

Figure 5:
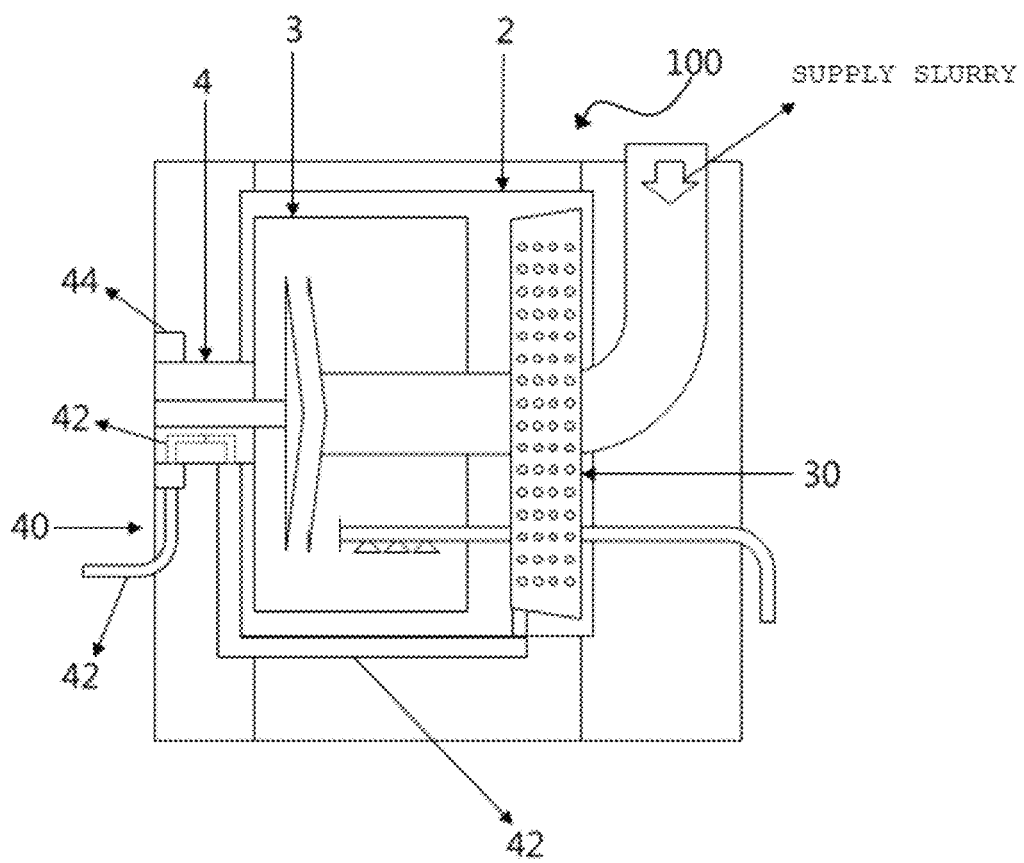
FIG. 5 is a cross-sectional view of a pressurizing centrifugal dehydrator according to an embodiment in which disposition of a gas supplying portion is changed.

FIG. 5 is a cross-sectional view of a pressurizing centrifugal dehydrator 100 according to an embodiment in which disposition of the gas supplying portion 40 is changed. The gas supplying portion 40 includes a supplying pipe fastening portion 44 connecting the outer basket shaft 4 and a gas supplying pipe 42 to each other, and the gas supplying pipe 42, and supplies gas into the pressurization chamber 30. The pressurizing centrifugal dehydrator 100 illustrated in FIG. 5 is different from the pressurizing centrifugal dehydrator 100 illustrated in FIG. 1 only in regard to the arrangement and structure of the gas supplying portion 40.

The spirit of the present invention has been illustratively described hereinabove. It will be appreciated by those skilled in the art that various modifications and alterations can be made without departing from the essential characteristics of the present invention. Accordingly, the embodiments disclosed in the present invention are not to limit the spirit of the present invention, but are to describe the spirit of the present invention. The scope of the present invention is not limited to these embodiments. The scope of the present invention should be interpreted by the following claims, and it should be interpreted that all the spirits equivalent to the following claims fall within the scope of the present invention.

The invention claimed is:

1. A pressurizing centrifugal dehydrator for removing moisture, the pressurizing centrifugal dehydrator comprising:
    an inner basket rotating along with an inner basket shaft and connected to a slurry supplying pipe;
    an outer basket rotating along with an outer basket shaft and surrounding the inner basket;
    a pressure-supplying chamber disposed inside the outer basket and outside the inner basket;
    a washing water supplying nozzle that supplies washing water to the inner basket; and
    a gas supplying pipe connected to the pressure-supplying chamber,
    wherein the pressurizing centrifugal dehydrator is configured to remove moisture from a slurry through perforated walls of the inner basket and the outer basket by a centrifugal force by rotation of the inner basket shaft and the outer basket shaft,
    wherein the inner basket shaft reciprocates to push out a dehydration product toward an area between the outer basket and the pressure-supplying chamber, and
    wherein the pressure-supplying chamber ejects a gas toward the dehydration product positioned between the outer basket and the pressure-supplying chamber through a pressurization gas path formed in a circumferential surface of the pressure-supplying chamber.

2. The pressurizing centrifugal dehydrator of claim 1, wherein the pressurization gas path comprises at least one of meshes, slits, and holes.

3. The pressurizing centrifugal dehydrator of claim 1, wherein a slurry supplying portion hole, through which the slurry supplying pipe for supplying the slurry to the inner basket penetrates, is formed in the pressure-supplying chamber.

4. The pressurizing centrifugal dehydrator of claim 1, wherein the gas moves outward from a central portion of the pressure-supplying chamber.

5. The pressurizing centrifugal dehydrator of claim 1, wherein the pressure-supplying chamber includes:
    a pressure-supplying chamber rotating portion that is fixed to the outer basket and rotates together with the outer basket;
    a pressure-supplying chamber fixing portion that is disposed in the pressure-supplying chamber rotating portion and is fixed without rotating; and
    a rotating-fixing connection portion disposed between the pressure-supplying chamber rotating portion and the pressure-supplying chamber fixing portion.

6. The pressurizing centrifugal dehydrator of claim 5, wherein the gas supplying pipe is connected to the pressure-supplying chamber fixing portion.

7. The pressurizing centrifugal dehydrator of claim 5, wherein the rotating-fixing connection portion fixes the pressure-supplying chamber fixing portion while allowing rotation of the pressure-supplying chamber rotating portion.

8. The pressurizing centrifugal dehydrator of claim 1, wherein an interval between the pressure-supplying chamber and the outer basket decreases as distance from the inner basket increases.

9. The pressurizing centrifugal dehydrator of claim 1, wherein the dehydration product is continuously discharged from the pressurizing centrifugal dehydrator.

\* \* \* \* \*